US009227482B2

(12) United States Patent
DiGasbarro et al.

(10) Patent No.: US 9,227,482 B2
(45) Date of Patent: Jan. 5, 2016

(54) AIRFLOW SELECTING MECHANISM FOR A VEHICLE CABIN AIR CONDITIONING APPARATUS

(75) Inventors: Daniel J. DiGasbarro, Oxford, MI (US); David A. Korenchuk, Royal Oak, MI (US); Masahide Honda, Gamagori (JP); Patrick J. Gannon, Livonia, MI (US); James Stander, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 822 days.

(21) Appl. No.: 13/426,710

(22) Filed: Mar. 22, 2012

(65) Prior Publication Data
US 2012/0247747 A1    Oct. 4, 2012

Related U.S. Application Data

(60) Provisional application No. 61/470,276, filed on Mar. 31, 2011.

(51) Int. Cl.
*B60H 1/00* (2006.01)
*B60H 1/32* (2006.01)
(Continued)

(52) U.S. Cl.
CPC ............ *B60H 1/00028* (2013.01); *B60H 1/244* (2013.01); *B60H 1/246* (2013.01); *B60H 2001/002* (2013.01); *B60H 2001/00099* (2013.01)

(58) Field of Classification Search
CPC ............. B60H 1/00028; B60H 1/0065; B60H 1/00864; B60H 1/00671; B60H 1/0088; B60H 1/00021; B60H 1/00035; B60H 1/00042; B60H 1/0005; B60H 1/00057; B60H 1/00564; B60H 1/00664; B60H 1/00821; B60H 1/00828; B60H 1/00835; B60H 1/242; B60H 1/244; B60H 1/246; B60H 2001/00078–2001/00107; B60H 2001/00135; B60H 2001/00142; B60H 2001/00185; B60H 2001/002; B60H 2001/00214; B60H 2001/00099

USPC ................... 165/42, 202, 203, 204
See application file for complete search history.

(56) References Cited

U.S. PATENT DOCUMENTS 4,711,295 A * 12/1987 Sakurai ....................... 165/203
5,180,004 A    1/1993 Nguyen
(Continued)

FOREIGN PATENT DOCUMENTS

JP    52-37400    8/1977
JP    2-61714    5/1990
(Continued)

OTHER PUBLICATIONS

Office action dated Mar. 11, 2014 n corresponding Japanese Application No. 2012-077239.
(Continued)

*Primary Examiner* — Tho V Duong
*Assistant Examiner* — Aaron Isenstadt
(74) *Attorney, Agent, or Firm* — Harness, Dickey & Pierce, P.L.C.

(57) ABSTRACT

A vehicle cabin air conditioning apparatus including an airflow selecting mechanism movable between a first position to provide a first airflow mode and a second position to provide a second airflow mode. The airflow selecting mechanism restricts first airflow from flowing from a first airflow conduit to a second airflow conduit when in the first position, and permits the first airflow from flowing from the first airflow conduit to the second airflow conduit when in the second position. An electronic control unit is configured to control a first blower based on a user set front cabin airflow level and a second blower based on a user set rear cabin airflow level when in the first airflow mode. The electronic control unit controls the first blower based on the user set front cabin airflow level and the user set rear cabin airflow level when in the second airflow mode.

18 Claims, 6 Drawing Sheets

(51) Int. Cl.
*F24H 3/06* (2006.01)
*B60H 1/24* (2006.01)

(56) References Cited

U.S. PATENT DOCUMENTS

| | | | |
|---|---|---|---|
| 5,186,237 A | 2/1993 | Adasek et al. | |
| 5,228,475 A | 7/1993 | Trill | |
| 5,236,393 A | 8/1993 | Milewski | |
| 5,309,731 A * | 5/1994 | Nonoyama et al. | 62/244 |
| 5,902,181 A | 5/1999 | Bain | |
| 5,927,380 A | 7/1999 | Scoccia | |
| 6,098,263 A | 8/2000 | Subler et al. | |
| 6,183,749 B1 * | 2/2001 | Park | 424/583 |
| 6,213,198 B1 * | 4/2001 | Shikata et al. | 165/202 |
| 6,311,763 B1 * | 11/2001 | Uemura et al. | 165/43 |
| 6,382,305 B1 | 5/2002 | Sano | |
| 6,415,851 B1 | 7/2002 | Hall et al. | |
| 6,520,850 B1 | 2/2003 | Buckman et al. | |
| 6,640,890 B1 * | 11/2003 | Dage et al. | 165/203 |
| 6,695,691 B1 | 2/2004 | Le | |
| 6,758,054 B2 | 7/2004 | Zheng et al. | |
| 6,881,140 B2 | 4/2005 | Le | |
| 7,156,166 B2 * | 1/2007 | Bendell et al. | 165/203 |
| 7,503,383 B2 * | 3/2009 | Yamaguchi et al. | 165/204 |
| 7,681,630 B2 * | 3/2010 | Klassen et al. | 165/202 |
| 2002/0017383 A1 * | 2/2002 | Vincent | 165/204 |
| 2002/0121557 A1 * | 9/2002 | Kaneura et al. | 237/12.3 A |
| 2003/0136139 A1 * | 7/2003 | Matsunaga et al. | 62/244 |
| 2004/0031602 A1 * | 2/2004 | Sugiura | 62/244 |
| 2004/0098995 A1 | 5/2004 | Ito et al. | |
| 2007/0193716 A1 | 8/2007 | Archibald et al. | |

FOREIGN PATENT DOCUMENTS

| | | |
|---|---|---|
| JP | 05-124421 | 5/1993 |
| JP | 09-086138 | 3/1997 |
| JP | 11-263123 | 9/1999 |
| JP | 2003-267035 | 9/2003 |
| JP | 2004-161060 | 6/2004 |
| JP | 2005-199978 | 7/2005 |

OTHER PUBLICATIONS

Office action dated Feb. 3, 2015 in corresponding Japanese Application No. 2012-077239.

* cited by examiner

AIRFLOW SELECTING MECHANISM FOR A VEHICLE CABIN AIR CONDITIONING APPARATUS

CROSS-REFERENCE TO RELATED APPLICATION

This application claims the benefit and priority of U.S. Provisional Application Ser. No. 61/470,276, filed Mar. 31, 2011, the entire disclosure of which is incorporated herein by reference.

FIELD

The present disclosure relates to an air conditioning apparatus for a vehicle.

BACKGROUND

Air conditioning performance requirements of larger vehicles, for example sport-utility vehicles or mini-vans, often means that in addition to the front (main) heating ventilating air conditioning (HVAC) unit, an auxiliary HVAC unit may be required to ensure adequate heating performance for the rear occupants. The auxiliary HVAC unit may result in a significant increase in components, vehicle weight, space, and cost.

An air conditioning apparatus with a single HVAC unit having two blowers, and providing conditioned air to the front and rear area of the vehicle cabin, is known by U.S. Patent Application Publication No. 2005/0126774. However, due to the configuration of its air conditioning case, the airflow amount provided to the front area of the vehicle cabin is affected by the airflow amount provided to the rear area of the vehicle cabin. Thus, the air conditioning apparatus disclosed by the U.S. Patent Application Publication No. 2005/0126774 cannot control front and rear airflow amounts separately with respect to the preferred front airflow level and the preferred rear airflow level, both of which can be set by a user of the vehicle.

SUMMARY

This section provides a general summary of the disclosure, and is not a comprehensive disclosure of its full scope or all of its features The present teachings provide for an air conditioning apparatus for a vehicle defining a vehicle cabin. The air conditioning apparatus generally includes an air conditioning case, a first blower, a second blower, an airflow selecting mechanism, a front blower level setting device, a rear blower level setting device, and an electronic control unit. The air conditioning case defines a first airflow passage leading to a front area of the vehicle cabin, and a second airflow passage leading to a rear area of the vehicle cabin. The first blower is configured to create airflow in the first airflow passage. The second blower is configured to create airflow in the second airflow passage. The airflow selecting mechanism is configured to select one of a first airflow mode preventing airflow created by the first blower from flowing into the second airflow passage, and a second airflow mode allowing airflow created by the first blower to flow into the second airflow passage. The front blower level setting device is for setting a preferred front airflow level in the front area of the vehicle cabin. The rear blower level setting device is for setting a preferred rear airflow level in the rear area of the vehicle cabin. The electronic control unit is electrically connected to the first blower, the second blower, the airflow selecting mechanism, the front blower level setting device, and the rear blower level setting device. When the airflow selecting mechanism selects the first airflow mode, the electronic control unit controls the first blower based on the preferred front airflow level, and controls the second blower based on the preferred rear airflow level. When the airflow selecting mechanism selects the second airflow mode, the electronic control unit controls the first blower based on the preferred front airflow level and the preferred rear airflow level.

The present teachings also provide for an air conditioning apparatus including a first airflow conduit, a second airflow conduit, a first blower, a second blower, an airflow selecting mechanism, and an electronic control unit. The first airflow conduit is configured to direct a first airflow to a front area of the vehicle cabin. The second airflow conduit is configured to direct a second airflow to a rear area of the vehicle cabin. The first blower is configured to create the first airflow in the first airflow passage. The second blower is configured to create the second airflow in the second airflow passage. The airflow selecting mechanism is movable between a first position to provide a first airflow mode of the apparatus and a second position to provide a second airflow mode of the apparatus. The airflow selecting mechanism restricts the first airflow from flowing into the second airflow conduit when in the first position. The airflow selecting mechanism permits the first airflow from flowing into the second airflow conduit when in the second position. The electronic control unit is configured to control the first blower based on a user set front cabin airflow level and control the second blower based on a user set rear cabin airflow level when in the first airflow mode. The electronic control unit is configured to control the first blower based on both the user set front cabin airflow level and the user set rear cabin airflow level when in the second airflow mode.

The present teachings further provide for an air conditioning apparatus that includes a first airflow passage, a second airflow passage, a first blower, a second blower, an evaporator, a first heater, a supplemental recirculation air inlet, and an airflow selecting mechanism. The first airflow passage is defined by a case of the air conditioning apparatus and is configured to direct a first airflow to a front area of the vehicle cabin. A second airflow passage is defined by the case and is adjacent to the first airflow passage. The second airflow passage is configured to direct a second airflow to a rear area of the vehicle cabin. The first blower is in the first airflow passage and is configured to create the first airflow in the first airflow passage. The second blower is in the second airflow passage and is configured to create the second airflow in the second airflow passage. The evaporator is in the first airflow passage. The first heater is in the first airflow passage. The evaporator is between the first blower and the first heater. The supplemental recirculation air inlet is in one of the first airflow passage or the second airflow passage. The airflow selecting mechanism is between the first airflow passage and the second airflow passage. The airflow selecting mechanism is movable between a closed position in which the airflow selecting mechanism restricts the first airflow from passing into the second airflow passage, and an open position in which the airflow selecting mechanism permits the first airflow to pass into the second airflow passage.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
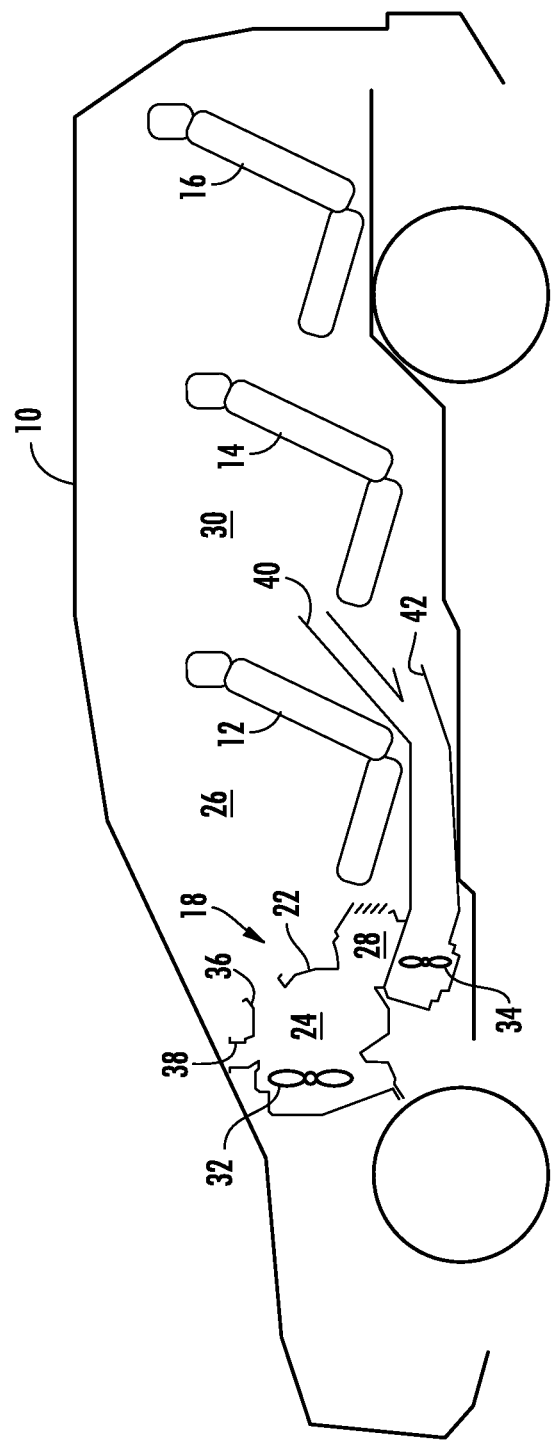
FIG. 1 is a cross-sectional view of a vehicle and an air conditioning apparatus according to the present teachings.

FIG. 1 is a cross-sectional view of a vehicle 10 and an air conditioning apparatus 18 for the vehicle 10 according to the present teachings. Vehicle 10 depicted in FIG. 1 is a larger sized vehicle, such as an SUV or mini-van, and includes a driver seat 12, second row seats 14, and third row seats 16. The air conditioning apparatus 18 includes two blowers and is accommodated in an air conditioning case 22.

The air conditioning case 22 defines a first airflow passage 24 ultimately leading to a front area 26 of the vehicle cabin in which the driver seat 12 is located, and a second airflow passage 28 ultimately leading to a rear area 30 of the vehicle cabin, in which the second row seats 14 and the third row seats 16 are located. A first blower 32 is located in the most upstream side of the air conditioning case 22, and a second blower 34 is located in the second airflow passage 28. The air conditioning case 22 further defines a front face outlet 36, a defroster outlet 38, and a front foot outlet (not illustrated), each of which are in communication with the first air flow passage 24. The air conditioning case 22 also defines a rear face outlet 40 and rear foot outlet 42, each of which are in communication with the second airflow passage 28.

Figure 2:
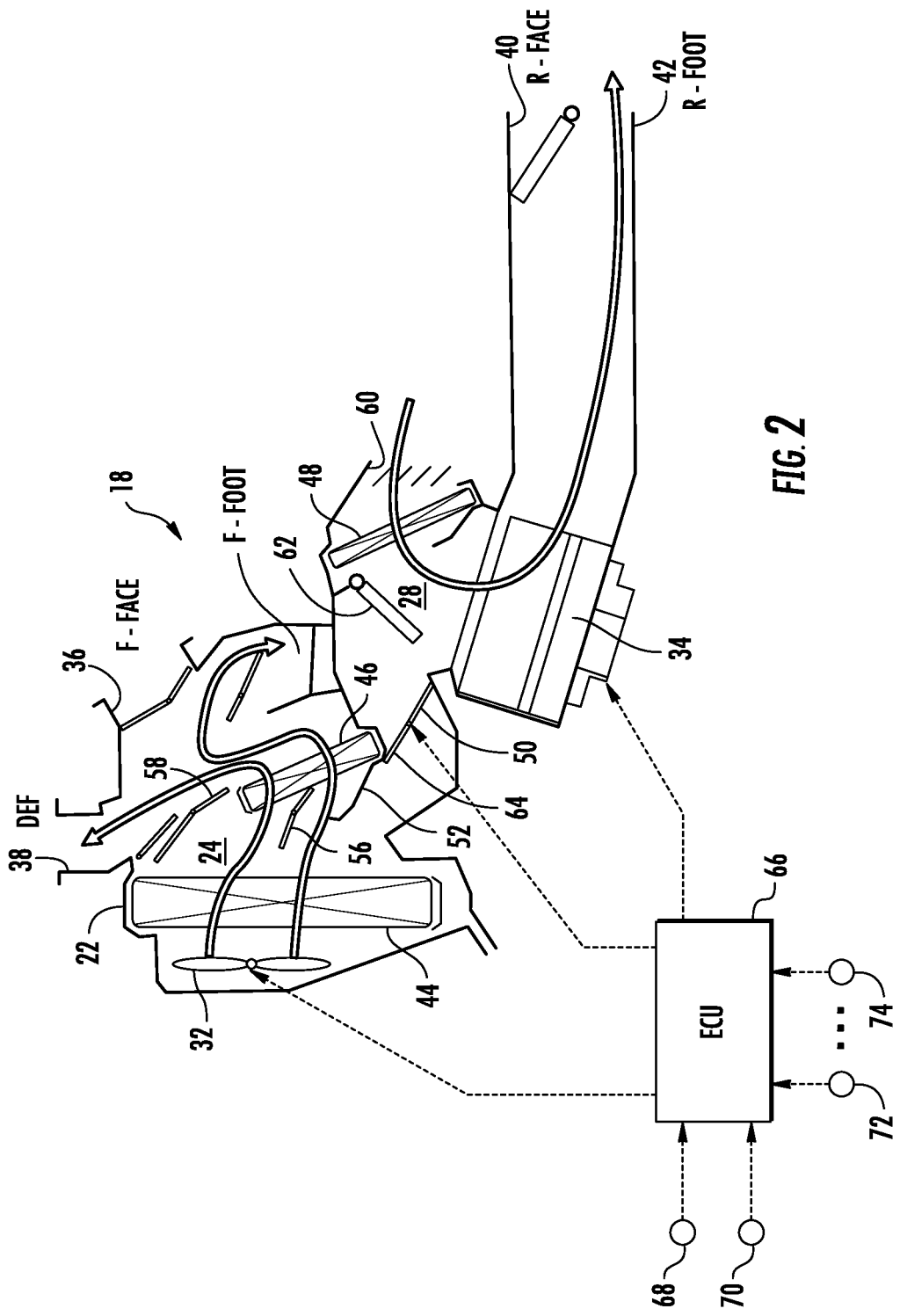
FIG. 2 is a cross-sectional view of the air conditioning apparatus of FIG. 1 configured in a first airflow mode and a foot-def mode.

FIG. 2 is a cross-sectional view of the air conditioning apparatus 18 depicting a first airflow mode (foot-def mode). The air conditioning case 22 further accommodates an evaporator 44, a first heater core 46, a second heater core 48, and a plurality of mode doors including airflow selecting mechanism 50.

The evaporator 44 is located proximate to the first blower 32 on the downstream side of the first blower 32. The air conditioning case 22 further defines a drain under the evaporator 44. The air conditioning case 22 also defines a separation wall 52, which divides the first airflow passage 24 and the second airflow passage 28 at the downstream side of the evaporator 44. The first heater core 46 is located in the first airflow passage 24. The first airflow passage 24 defines bypass passage 54 (FIG. 3 for example) bypassing the first heater core 46. The airflow flowing into the first airflow passage 24 passes through either one of the first heater core 46 and/or the bypass passage 54. The flow ratio between the airflow passing through the first heater core 46 and the bypass passage 54 is controlled by air mix door 56 and bypass passage door 58.

The second airflow passage 28 includes a supplemental recirculation air inlet 60. The supplemental recirculation air inlet 60 is opened and closed by recirculation door 62. The second heater core 48 is configured to exchange heat with airflow from the supplemental recirculation air inlet 60. The second heater core 48 is between the supplemental recirculation air inlet 60 and the recirculation door 62.

The airflow selecting mechanism 50 includes an airflow selecting door 64 disposed at the upstream side of the second airflow passage 28. If this airflow selecting door 64 closes the inlet of the second airflow passage 28, the air conditioning case 22 constitutes a first airflow mode preventing airflow created by the first blower 32 from flowing into the second airflow passage 28. If the airflow selecting door 64 opens the inlet of the second airflow passage 28, the air conditioning case 22 constitutes a second airflow mode allowing the airflow created by the first blower 32 to flow into the second airflow passage 28.

With reference to FIG. 2, the airflow passing through the evaporator 44 flows into the first airflow passage 24 because the airflow selecting door 64 is closed to restrict airflow from moving between the first and the second airflow passages 24 and 28 (i.e. the air conditioning case 22 is in the first airflow mode). The airflow passes through the first heater core 46 because the air mix door 56 opens the first heater core 46, and the bypass passage door 58 closes the bypass passage 54. The airflow is divided into two airflows and is distributed to either one of the defroster outlet 38 or the front foot outlet.

With continued reference to FIG. 2, the recirculation door 62 opens supplemental recirculation air inlet 60. Air from the supplemental recirculation air inlet 60 passes through the second heater core 48, and is pulled in by the second blower 34. The airflow from the second blower 34 is distributed to the lower side of the rear area 30 of the vehicle cabin. In other words, when the airflow selecting mechanism 50 selects the first airflow mode, the second blower 34 introduces recirculated airflow from the vehicle cabin.

FIG. 2 further depicts electronic control unit (ECU 66). The ECU 66 is electrically connected to the first blower 32, the second blower 34, the airflow selecting mechanism 50, a front blower level setting device 68, and a rear blower level setting device 70. The front blower level setting device 68 is configured to be used by a user of the vehicle 10 for setting a preferred front airflow level in the front area 26 of the vehicle cabin. The rear blower level setting device 70 is configured to be used by a user of the vehicle 10 for setting a preferred rear airflow level in the rear area 30 of the vehicle cabin.

When the airflow selecting mechanism 50 selects the first airflow mode, the ECU 66 controls the first blower 32 based on the preferred front airflow level, and controls the second blower 34 based on the preferred rear airflow level. When the airflow selecting mechanism 50 selects the second airflow mode, the ECU 66 controls the first blower 32 based on the preferred front airflow level and the preferred rear airflow level.

The ECU 66 is further connected to various sensors 72 and input means 74. The ECU 66 calculates the target temperature of air outlet (TAO) based on information obtained from the front blower level setting device 68, the rear blower level setting device 70, the various sensors 72, and input means 74. The ECU 66 controls a plurality of doors accommodated in the air conditioning case 22 based on the TAO and information obtained from the various sensors 72 and input means 74. ECU 66 may control a compressor of a refrigerant cycle by an energizing electro magnetic clutch, or electrical motor based on the TAO, and the blower levels set by the front and rear blower level setting device 70.

The evaporator 44 is part of the refrigeration cycle, along with the compressor, condenser, and expansion valve. The first heater core 46 and the second heater core 48 may utilize heat of engine cooling circuit or electrical power. Thus, the second heater core 48 may be an electrical heater.

By this first airflow mode, the air conditioning apparatus 18 can control two blowers separately because the amount of the airflow in the first airflow passage 24 is independent from the amount of the airflow in the second airflow passage 28. Furthermore, it is possible to warm up the cabin temperature using only the second blower 34 and the second heater core 48 (electrical heater) while warming up the engine (i.e. when the temperature of the engine cooling circuit is low).

Figure 3:
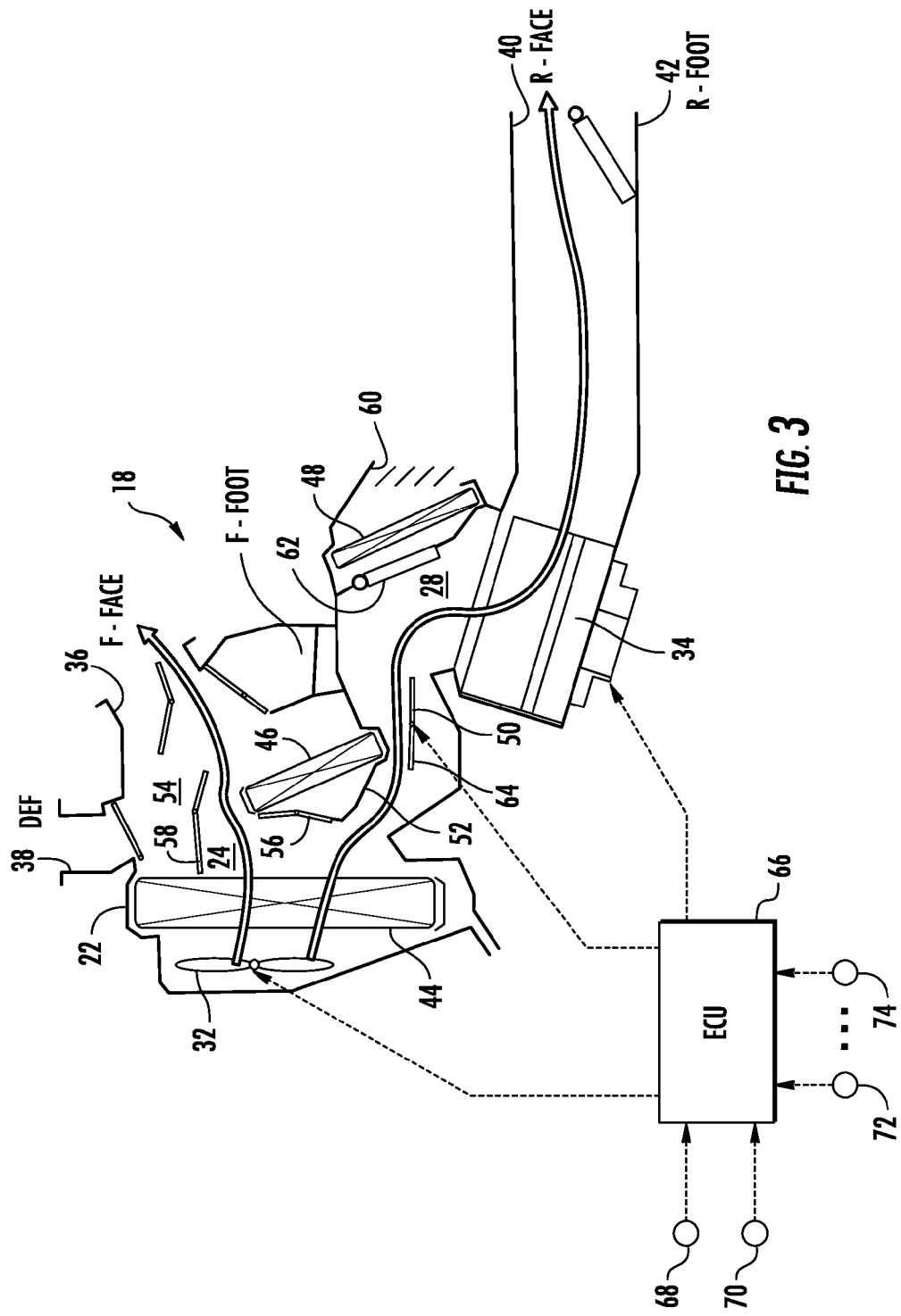
FIG. 3 is a cross-sectional view of the air conditioning apparatus of FIG. 1 configured in a second airflow mode and a face mode.

FIG. 3 is a cross-sectional view of the air conditioning apparatus 18 illustrating the second airflow mode (face mode). In the second airflow mode, the airflow selecting door 64 opens the upstream side of the second airflow passage 28. Thus, airflow created by the first blower 32 is divided into two airflows by the separation wall 52. The divided airflow is directed into the second airflow passage 28 as well as the first airflow passage 24.

In the second airflow mode (face mode) illustrated in FIG. 3, the air mix door 56 shields first heater core 46, and bypass passage door 58 opens the bypass passage 54. Thus, airflow passes through the first airflow passage 24, bypasses the first heater core 46, and provides cooled air to the front face outlet 36. In the face mode illustrated in FIG. 3, the recirculation door 62 closes the supplemental recirculation air inlet 60. Thus, airflow created by the first blower 32 is directed into the second airflow passage 28 and is provided to the rear face outlet 40 without passing through the second heater core 48.

Figure 4:
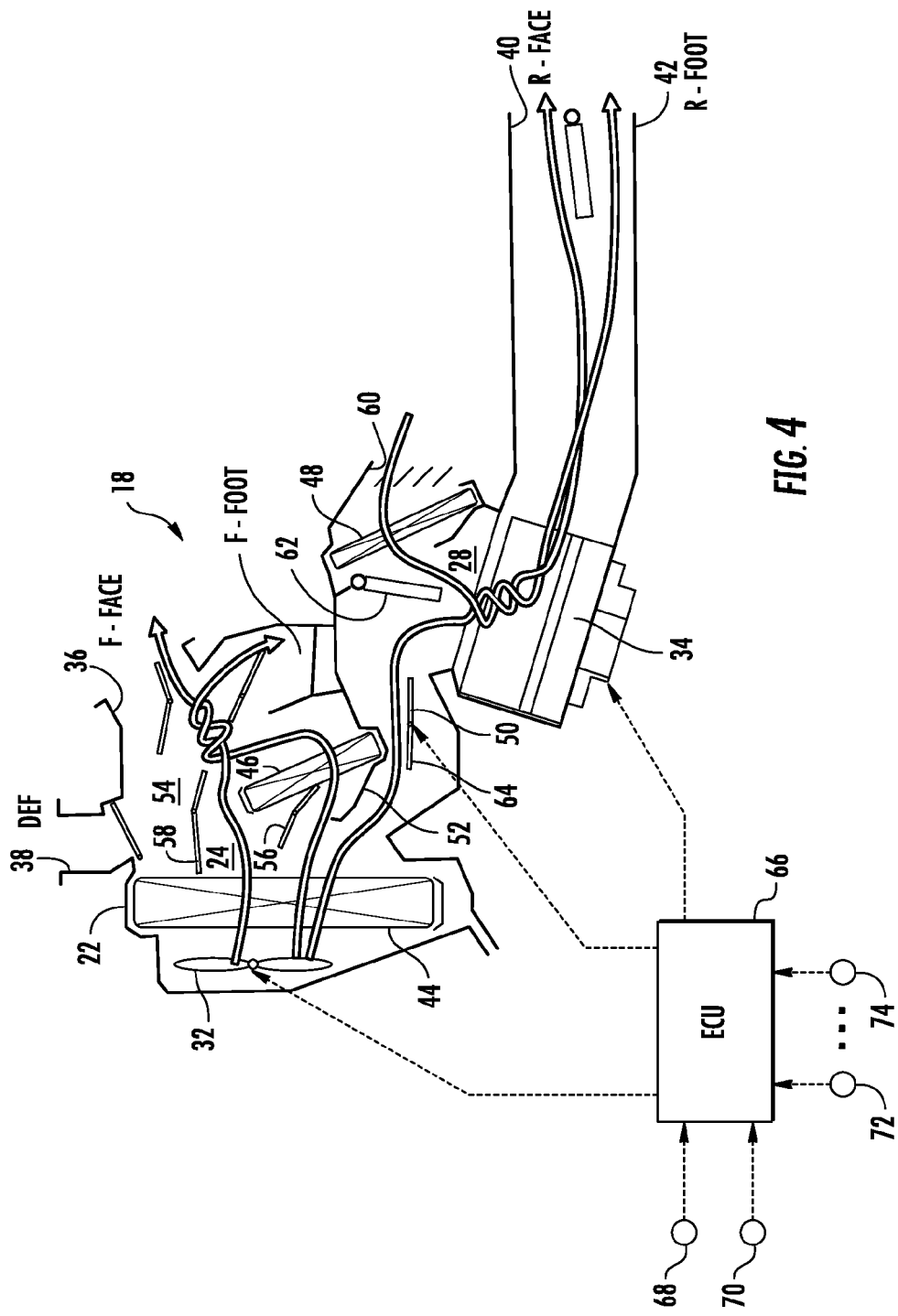
FIG. 4 is a cross-sectional view of the air conditioning apparatus of FIG. 1 configured in the second airflow mode and a bi-level mode.

FIG. 4 also illustrates the second airflow mode. In FIG. 4, the mode doors constitute bi-level mode. In bi-level mode, the air mix door 56 opens the airflow to the first heater core 46, and the airflow flowing in the first airflow passage 24 is divided into two airflows. One of the divided airflows passes through the first heater core 46, and the other one of the divided airflows bypasses the first heater core 46. The two airflows are mixed in the first airflow passage 24, and are distributed to the front area 26 of the vehicle cabin from the front face outlet 36 and the front foot outlet.

In FIG. 4, the airflow selecting door 64 opens the inlet of the second airflow passage 28. Thus, airflow created by the first blower 32 is directed into the second airflow passage 28, and airflow cooled by the evaporator 44 is directed into the second blower 34. Also, during bi-level mode shown in FIG. 4, the recirculation door 62 opens supplemental recirculation air inlet 60. Thus, the second heater core 48 provides hot air into the second blower 34. The second blower 34 mixes the cooled air and the hot air, and distributes mixed air to the rear area 30 of the vehicle cabin from the rear face outlet 40 and the rear foot outlet 42. In other words, when the airflow selecting mechanism 50 selects the second airflow mode, the second blower 34 may mix the airflow created by the first blower 32 with recirculated airflow from the vehicle cabin.

Figure 5:
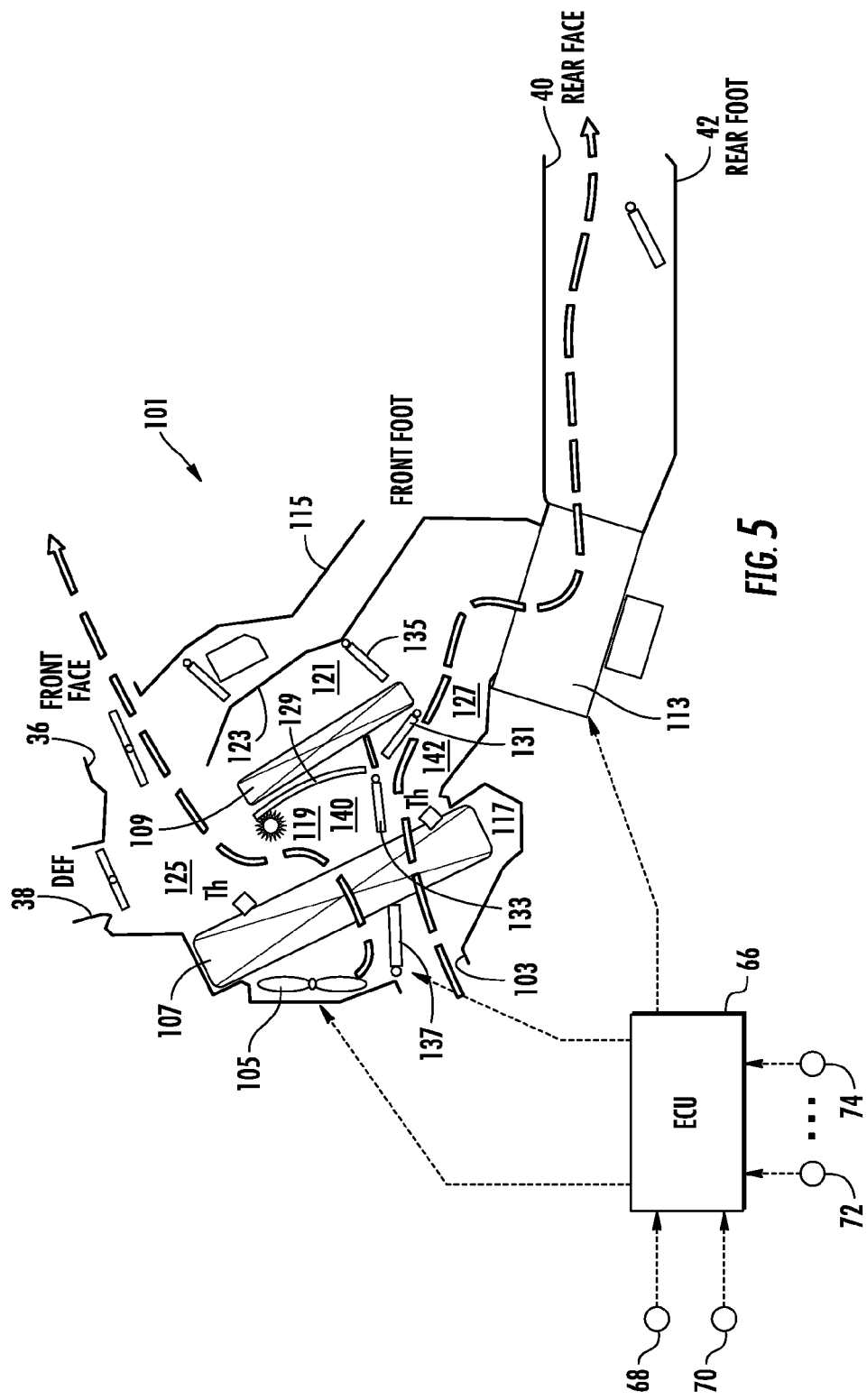
FIG. 5 is a cross-sectional view of another air conditioning apparatus according to the present teachings configured in the first airflow mode and face mode.

With additional reference to FIG. 5, another air conditioning apparatus according to the present teachings is illustrated at reference number 101. FIG. 5 is a cross-sectional view of the air conditioning apparatus 101 in a first airflow mode (face mode). The air conditioning case 115 includes a supplemental recirculation air inlet 103 at an upstream side of an evaporator 107.

The air conditioning case 115 accommodates a first blower 105, the evaporator 107, a heater core 109, a plurality of doors, and a second blower 113. The first blower 105 is located at the most upstream side of air conditioning case 115.

The evaporator 107 is disposed on a downstream side of the first blower 105 and the supplemental recirculation air inlet 103. The evaporator 107 and the inner wall of the air conditioning case 115 define a gap 117 therebetween under the evaporator 107. The evaporator 107 is equipped with two temperature sensors (Th).

The heater core 109 is disposed on a downstream side of the evaporator 107. The heater core 109 defines an upstream clearance 119 between the evaporator 107 and the heater core 109. The heater core 109 further defines a downstream clearance 121 between the heater core 109 and the inner vertical wall 123, which is positioned on a downstream side of the heater core 109 in the air conditioning case 115. The air conditioning case 115 defines an upper bypass passage 125 at an upper side of the heater core 109, and further defines a lower bypass passage 127 at a lower side of the heater core 109. The heater core 109 is thus between the upper bypass passage 125 and the lower bypass passage 127.

A front air mix door 129 is located between the evaporator 107 and the heater core 109. The front air mix door 129 can be a slide type door. The front air mix door 129 is positioned in either one of the upper bypass passage 125 or the upstream clearance 119. A rear air mix door 131 is disposed in the upstream clearance 119. An axis of rotation of the rear air mix door 131 is disposed at a lower side of the heater core 109.

An upstream side airflow control door 133 is disposed in the upstream clearance 119. A downstream side airflow control door 135 is disposed in the downstream clearance 121. As illustrated in FIG. 5, the air conditioning case 115 defines a first airflow passage 140 and a second airflow passage 142 divided by a recirculation door 137, the upstream side airflow control door 133, and the downstream side airflow control door 135. Thus, the recirculation door 137, the upstream side airflow control door 133, and the downstream side airflow control door 135 constitute a separation wall between the first airflow passage 140 and the second airflow passage 142.

If the recirculation door 137, the upstream side airflow control door 133, and the downstream side airflow control door 135 are closed to constitute a separation wall, the airflow created by the first blower 105 is prevented from flowing into the second airflow passage 142. The air conditioning case 115 defines the first airflow mode in this manner. Thus, the airflow selecting mechanism is the recirculation door 137, the upstream side airflow control door 133, and the downstream side airflow control door 135. Also, the upstream side airflow control door 133 is configured to control the airflow amount drawn into the second airflow passage.

As illustrated in FIG. 5, airflow created by the first blower 105 passes through the upper half of the evaporator 107 and the heater core 109. Airflow directed from the supplemental recirculation air inlet 103 passes through the lower half of the evaporator 107 and the heater core 109.

FIG. 5 depicts max cool face mode. Thus, front air mix door 129 opens the upper bypass passage 125, and prevents airflow from passing through the heater core 109. The rear air mix door 131 opens the lower bypass passage 127 and prevents airflow from passing through the heater core 109. The mode doors open front face outlet 36 and rear face outlet 40, and close defroster outlet 38, front foot outlet, and rear foot outlet 42. Thus airflows passed through the evaporator 107 are provided to the front face outlet 36 and rear face outlet 40 without passing through the heater core 109.

By this first airflow mode, the air conditioning apparatus 101 can separately control the first blower 105 and the second blower 113 based on the preferred blower levels set by the user of the vehicle 10. The first airflow passage 140 and the second airflow passage 142 are equipped with respective air inlets and blowers. Thus, the amount of the airflow in first airflow passage 140 can be controlled by the first blower 105 independent from the amount of the airflow in second airflow passage 142.

Figure 6:
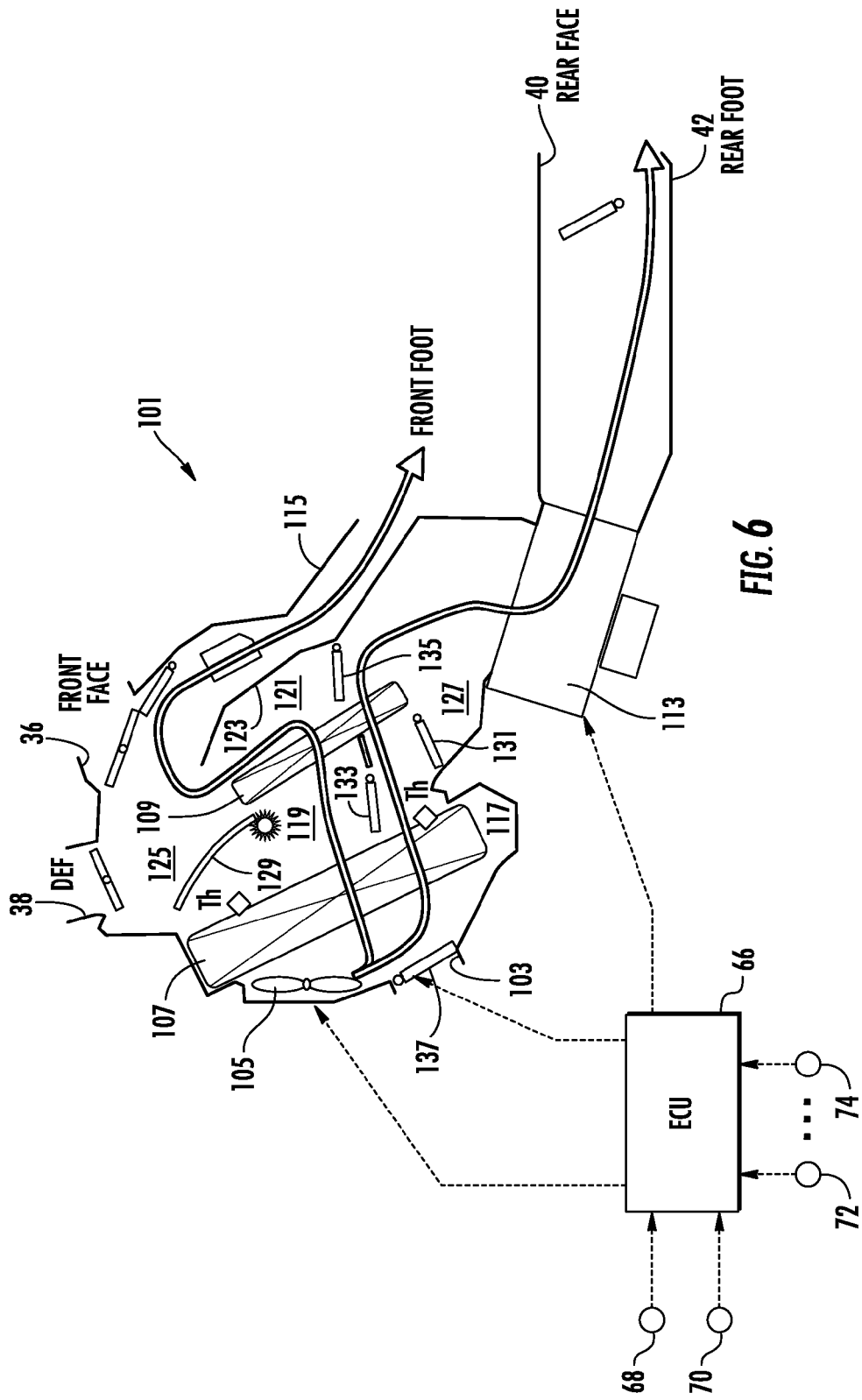
FIG. 6 is a cross-sectional view of the air conditioning apparatus of FIG. 5 configured in the second air flow mode and a foot mode.

FIG. 6 is a cross-sectional view of the air conditioning apparatus 101 configured in a second airflow mode (foot mode). In FIG. 6, the front air mix door 129 closes upper bypass passage 125, and the rear air mix door 131 closes the lower bypass passage 127. The defroster outlet 38, the front face outlet 36, and the rear face outlet 40 are closed by the plurality of mode doors. Thus, airflows passed through the evaporator 107 and heater core 109 are provided to the front foot outlet and rear foot outlet 42.

The first blower 105 may intake air from outside or inside the vehicle cabin. Thus, if the temperature sensor Th disposed in the lower side of the evaporator 107 detects a predetermined temperature, the ECU 66 may control the airflow selecting mechanism to select the second airflow mode and intake the outside air to prevent evaporator 107 from frosting. Therefore, the present teachings may increase functionality. Furthermore, the present teachings may reduce component and vehicle complexity from existing dual unit assemblies because the present disclosure may reduce dual air conditioner plumbing, dual heater hose assemblies, and dual wire harnesses.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air conditioning apparatus for a vehicle defining a vehicle cabin, the air conditioning apparatus comprising:
   an air conditioning case defining a first airflow passage leading to a front area of the vehicle cabin, and a second airflow passage leading to a rear area of the vehicle cabin, the second airflow passage includes a supplemental recirculation air inlet;
   a first blower configured to create airflow in the first airflow passage;
   a second blower configured to create airflow in the second airflow passage, the air conditioning case accommodates both the first and the second blowers;
   an airflow selecting mechanism configured to select one of a first airflow mode preventing airflow created by the first blower from flowing into the second airflow passage, and a second airflow mode allowing airflow created by the first blower to flow into the second airflow passage, the airflow selecting mechanism includes a recirculation door configured to open and close the supplemental recirculation air inlet;
   a heater core at least proximate to the supplemental recirculation air inlet;
   a front blower level setting device for setting a preferred front airflow level in the front area of the vehicle cabin;
   a rear blower level setting device for setting a preferred rear airflow level in the rear area of the vehicle cabin; and
   an electronic control unit electrically connected to the first blower, the second blower, the airflow selecting mechanism, the front blower level setting device, and the rear blower level setting device;
   wherein:
   when the airflow selecting mechanism selects the first airflow mode, the electronic control unit controls the first blower based on the preferred front airflow level, and controls the second blower based on the preferred rear airflow level;
   when the airflow selecting mechanism selects the second airflow mode, the electronic control unit controls the first blower based on the preferred front airflow level and the preferred rear airflow level, and the electronic control unit actuates the recirculation door to open the supplemental recirculation air inlet; and
   the second blower is configured to mix a first airflow blown by the first blower with a second airflow that has entered the air conditioning case through the supplemental recirculation air inlet and has been heated by the heater core.

2. The air conditioning apparatus for a vehicle according to claim 1, wherein when the airflow selecting mechanism selects the first airflow mode, the second blower introduces recirculated airflow from the vehicle cabin into the second airflow passage.

3. The air conditioning apparatus for a vehicle according to claim 1, wherein when the airflow selecting mechanism selects the second airflow mode, the second blower mixes the first airflow and the second airflow, the first airflow is different from the second airflow.

4. The air conditioning apparatus for a vehicle according to claim 1, further comprising an additional heater disposed in the first airflow passage.

5. An air conditioning apparatus for a vehicle defining a vehicle cabin, the air conditioning apparatus comprising:
   a first airflow conduit configured to direct a first airflow to a front area of the vehicle cabin;
   a second airflow conduit configured to direct a second airflow to a rear area of the vehicle cabin, the second airflow conduit includes a supplemental recirculation air inlet;
   a first blower configured to create the first airflow in the first airflow conduit;
   a second blower configured to create the second airflow in the second airflow conduit, both the first blower and the second blower are included in a common air conditioning case;
   an airflow selecting mechanism movable between a first position to provide a first airflow mode of the apparatus and a second position to provide a second airflow mode of the apparatus, the airflow selecting mechanism restricts the first airflow from flowing into the second airflow conduit when in the first position, and the airflow selecting mechanism permits the first airflow to flow into the second airflow conduit when in the second position;
   a recirculation door included with the airflow selecting mechanism and configured to open and close the supplemental recirculation air inlet;
   a heater core at least proximate to the supplemental recirculation air inlet; and
   an electronic control unit configured to control the first blower based on a user set front cabin airflow level and control the second blower based on a user set rear cabin airflow level when in the first airflow mode, and the electronic control unit is configured to control the first blower based on both the user set front cabin airflow level and the user set rear cabin airflow level when in the second airflow mode;

wherein:
in the second airflow mode, the electronic control unit actuates the recirculation door to open the supplemental recirculation air inlet; and
the second blower is configured to mix airflow blown by the first blower with airflow that has entered the air conditioning case through the supplemental recirculation air inlet and has been heated by the heater core.

6. The air conditioning apparatus of claim 5, wherein the first airflow conduit is directly connected to the second airflow conduit.

7. The air conditioning apparatus of claim 5, wherein the airflow selecting mechanism is between the first airflow conduit and the second airflow conduit.

8. The air conditioning apparatus of claim 5, wherein the air conditioning apparatus includes only a single evaporator.

9. The air conditioning apparatus of claim 5, wherein the first blower is in the first conduit.

10. The air conditioning apparatus of claim 9, wherein the second blower is in the second conduit.

11. The air conditioning apparatus of claim 5, wherein the supplemental recirculation air inlet is open when in the first airflow mode.

12. An air conditioning apparatus for a vehicle defining a vehicle cabin, the air conditioning apparatus comprising:
a first airflow passage defined by a case of the air conditioning apparatus, the first airflow passage configured to direct a first airflow to a front area of the vehicle cabin;
a second airflow passage defined by the case and adjacent to the first airflow passage, the second airflow passage configured to direct a second airflow to a rear area of the vehicle cabin;
a first blower in the first airflow passage and configured to create the first airflow in the first airflow passage;
a second blower in the second airflow passage and configured to create the second airflow in the second airflow passage, both the first blower and the second blower are included in the case;
an evaporator in the first airflow passage;
a first heater in the first airflow passage, the evaporator is between the first blower and the first heater;
a second heater in the second airflow passage;
a supplemental recirculation air inlet in the second airflow passage, the first heater is proximate to the supplemental recirculation air inlet; and
an airflow selecting mechanism between the first airflow passage and the second airflow passage, the airflow selecting mechanism is movable between a closed position in which the airflow selecting mechanism restricts the first airflow from passing into the second airflow passage and an open position in which the airflow selecting mechanism permits the first airflow to pass into the second airflow passage;
a recirculation door included with the airflow selecting mechanism and configured to open and close the supplemental recirculation air inlet;

wherein:
in a first airflow mode, the airflow selecting mechanism is in the closed position;
in a second airflow mode, the electronic control unit actuates the recirculation door to open the supplemental recirculation air inlet; and
the second blower is configured to mix airflow blown by the first blower with airflow that has entered the air conditioning case through the supplemental recirculation air inlet and has been heated by the heater core.

13. The air conditioning apparatus of claim 12, wherein the second heater is an electric heater.

14. The air conditioning apparatus of claim 12, wherein in the first airflow mode the supplemental recirculation air inlet is open such that the first airflow is controlled by the first blower and the second airflow is controlled by the second blower.

15. The air conditioning apparatus of claim 14, wherein the supplemental recirculation air inlet is configured to introduce into the second airflow passage recirculated airflow from the vehicle cabin when open.

16. The air conditioning apparatus of claim 12, wherein in the second airflow mode the airflow selecting mechanism is in the open position.

17. The air conditioning apparatus of claim 14, further comprising an electronic control mechanism configured to control the first blower based on a preferred front cabin airflow level and control the second blower based on a preferred rear cabin airflow level when in the first airflow mode.

18. The air conditioning apparatus of claim 12, further comprising an electronic control mechanism configured to control the first blower and the second blower; and wherein:
the airflow selecting mechanism is in the open position such that the second airflow is controlled by the first blower; and
the electronic control mechanism controls the first blower based on both a preferred front cabin airflow level and a preferred rear cabin airflow level.

* * * * *